United States Patent
Wu

(10) Patent No.: US 6,477,270 B1
(45) Date of Patent: Nov. 5, 2002

(54) METHOD FOR CONVERTING A HIGH RESOLUTION IMAGE TO TRUE COLOR USING A LOW RESOLUTION COLOR IMAGE

(76) Inventor: Yecheng Wu, 5 Appletree La., Lexington, MA (US) 02420

( * ) Notice: Subject to any disclaimer, the term of this patent is extended or adjusted under 35 U.S.C. 154(b) by 0 days.

(21) Appl. No.: 09/425,155

(22) Filed: Oct. 21, 1999

(51) Int. Cl.[7] .................................................. G06K 9/00
(52) U.S. Cl. ...................... 382/167; 382/162; 382/191; 382/254; 382/294; 382/276
(58) Field of Search .................. 382/162, 167, 382/191, 254, 274, 276, 294

(56) References Cited

U.S. PATENT DOCUMENTS 5,970,216 A * 10/1999 Tanio et al. ................. 395/112
6,055,336 A * 4/2000 Niki .......................... 382/237
6,263,103 B1 * 7/2001 Freeman et al. ............ 382/173

OTHER PUBLICATIONS

"Space Imaging Catalog of Products and Services", vol. 1, Feb. 1999.
Castleman, K.R., "Applications of Geometric Operations," in *Digital Image Processing*, Alan V. Oppenheim, ed. (Englewood Cliffs, NJ: Prentice–Hall), pp. 119–122 (1979).

* cited by examiner

Primary Examiner—Phuoc Tran
Assistant Examiner—Ali Bayat
(74) Attorney, Agent, or Firm—Hamilton, Brook, Smith & Reynolds, P.C.

(57) ABSTRACT

A method for converting a high resolution greyscale digital image to a color image using a low resolution digital color image of the same area or region. The low resolution color image is first registered to the high resolution greyscale image. For each pixel in the high resolution greyscale image, three color elements (red, green, blue or RGB) are calculated from the value of the pixel in the greyscale image and the color value (RGB) of the pixel at the same location in the registered color image. After this process, the high resolution greyscale image will have red, green and blue color elements (RGB) to be used and displayed as a color image.

8 Claims, 4 Drawing Sheets

```
CreateRGBFromGreyscale()
{
For (each pixel in greyscale image)
{
A = 0.299; B = 0.587; C = 0.114;
T = V/(A*Red + B*Green + C*Blue);
NewRed = T*Red;
NewGreen = T*Green;
NewBlue = T*Blue;
}
}
```

ORIGINAL IMAGE

REGISTERED IMAGE

SCALAR T CALCULATON:
T = V/(0.299*RED + 0.587*GREEN + 0.114*BLUE)

| 25 | 0.1333 | 0.2666 | 0.2666 | 1.0665 |
|---|---|---|---|---|
|  | 0.1333 | 0.2666 | 0.9332 | 1.0665 |
|  | 0.2666 | 0.9332 | 1.0665 | 1.1998 |
|  | 0.7999 | 0.9332 | 1.1998 | 1.1998 |

CALCULATED T VALUES FOR
EACH PIXEL (4X4)

FIG. 4

HIGH RES COLOR IMAGE OUTPUT (4X4 RGB):    75
NEW RED = T*RED
NEW GREEN = T*GREEN
NEW BLUE = T*BLUE

RED (25):
| 1 | 2 | 2 | 10 |
|---|---|---|---|
| 1 | 2 | 8 | 10 |
| 2 | 8 | 10 | 11 |
| 7 | 8 | 11 | 11 |

GREEN (25):
| 1 | 2 | 2 | 9 |
|---|---|---|---|
| 1 | 2 | 8 | 9 |
| 2 | 8 | 9 | 10 |
| 6 | 8 | 10 | 10 |

BLUE (25):
| 0 | 0 | 0 | 1 |
|---|---|---|---|
| 0 | 0 | 1 | 1 |
| 0 | 1 | 1 | 1 |
| 1 | 1 | 1 | 1 |

RGB VALUES OF THE OUTPUT
COLOR IMAGE

FIG. 5

METHOD FOR CONVERTING A HIGH RESOLUTION IMAGE TO TRUE COLOR USING A LOW RESOLUTION COLOR IMAGE

BACKGROUND OF THE INVENTION

1. Technical Field

The field of the invention relates to greyscale and color image processing and in particular to convert a high resolution greyscale image to color using a low resolution color image, for example, images acquired from satellite or aerial imaging devices with different resolutions.

2. Background Art

Any digital camera or scanner, or almost any electronic imaging device that captures image data will take in an image as either a greyscale value from 0 to 225, or a color value typically split into red, green and blue (RGB), with the intensity of each color being represented by some numeric range from 0 to 255, for example. An image with multiple spectral elements may include additional color elements, such as infrared and thermal elements and still be treated as a color image.

A greyscale image contains a range of values from 0 to 255, in the most common case. A color image or multi-spectral image contains three or more color elements represented by a range from 0 to 255. In this case, the image would actually have three bytes of information, (e.g., three 8-bit elements). One being red, one being green, and one being blue. Each pixel would have those three bytes associated with it to describe the color represented by that pixel. For example, a yellow pixel would be represented as (255, 255, 0).

Although there are many different definitions for image resolution, it is defined here as the physical pixel size used in the image, in other words, the size of the physical area a pixel covers. For example, a pixel in a 2-meter resolution image covers a 2×2 square meter area, while a pixel in a 30-meter resolution image covers a 30×30 square meter area. In this case, the 2-meter resolution is called a high resolution image and the 30-meter resolution image is called a low resolution image, as compared to each other. Because of smaller pixel size, a high resolution image contains more details than a low resolution image.

According to Castleman, "Digital Image Processing", 1979, pp. 119–122, incorporated herein by reference, image registration is applied to register similar images for comparison purposes. Image registration can either physically create a new image from a source image that matches the target image on a pixel by pixel basis or establish a geometric transformation for each pixel in the target image to find the location or address of the corresponding pixel from the source image.

Conversion from a color image to greyscale image is then as follows. The greyscale value is calculated directly from the three color element values: V=A*Red+B*Green+C*Blue, where Red, Green and Blue are the three color elements of a color pixel; A, B and C are coefficients that correspond to the "NTSC" red, green and blue CRT phosphors of 1953 and are standardized in ITU-R Recommendation BT. 601-2 (formerly CCIR Rec. 601-2), incorporated herein by reference; their values are 0.299, 0.587 and 0.114 respectively and can be adjusted according to imaging device characteristics.

Conversion from a greyscale image to color image (not pseudo color image in this case) is rather difficult without additional information. In this case, three color elements have to be calculated from a single greyscale pixel value, which is not possible mathematically.

SUMMARY OF THE INVENTION

The method of the present invention is for converting a high resolution greyscale image to color using a low resolution color or multi-spectral image of the same area.

In conjunction with present invention a low resolution color or multi-spectral image is first registered against the high resolution greyscale image. To that end, each pixel in the high resolution greyscale image has a corresponding pixel in the low resolution color image. Combining information from the registered color image and high resolution greyscale image, the method assigns color value (RGB) to each pixel in the high resolution greyscale image and converts the greyscale image to a high resolution color image.

BRIEF DESCRIPTION OF DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 4 shows T values calculated for each pixel using the invention.

FIG. 5 shows the RGB values are calculated using the present invention for each pixel in the final color image.

DETAILED DESCRIPTION OF THE PREFERRED EMBODIMENT

In conjunction with the present invention images are processed on a pixel-by-pixel basis. Each pixel in the greyscale image typically is represented by a single 8-bit (1 byte) value in the range of 0–255, while a pixel in the color image is represented by 3 values (Red, Green, Blue) or 24-bit (3 bytes) RGB.

Some multi-spectral images may contain more color elements than 3, for example, LANDSAT TM satellite image has 7 spectral or color elements for each pixel, including red, green, blue, near infrared, middle infrared, and thermal spectral bands. Normally, red, green and blue elements are called visible elements, while infrared and thermal bands are called invisible, as to the human eyes.

For multi-spectral images, a color element, for example, near infrared, may be used in the implementation of the present invention to replace one of the visible elements (red, green, blue). A color image consists of invisible color elements is normally called pseudo color image.

The present greyscale to color conversion invention may be implemented in software or directly in hardware. The present invention could also be implemented in a combination of software and hardware, by optimizing specific functions in hardware to increase efficiency of the overall system.

Figure 1A:
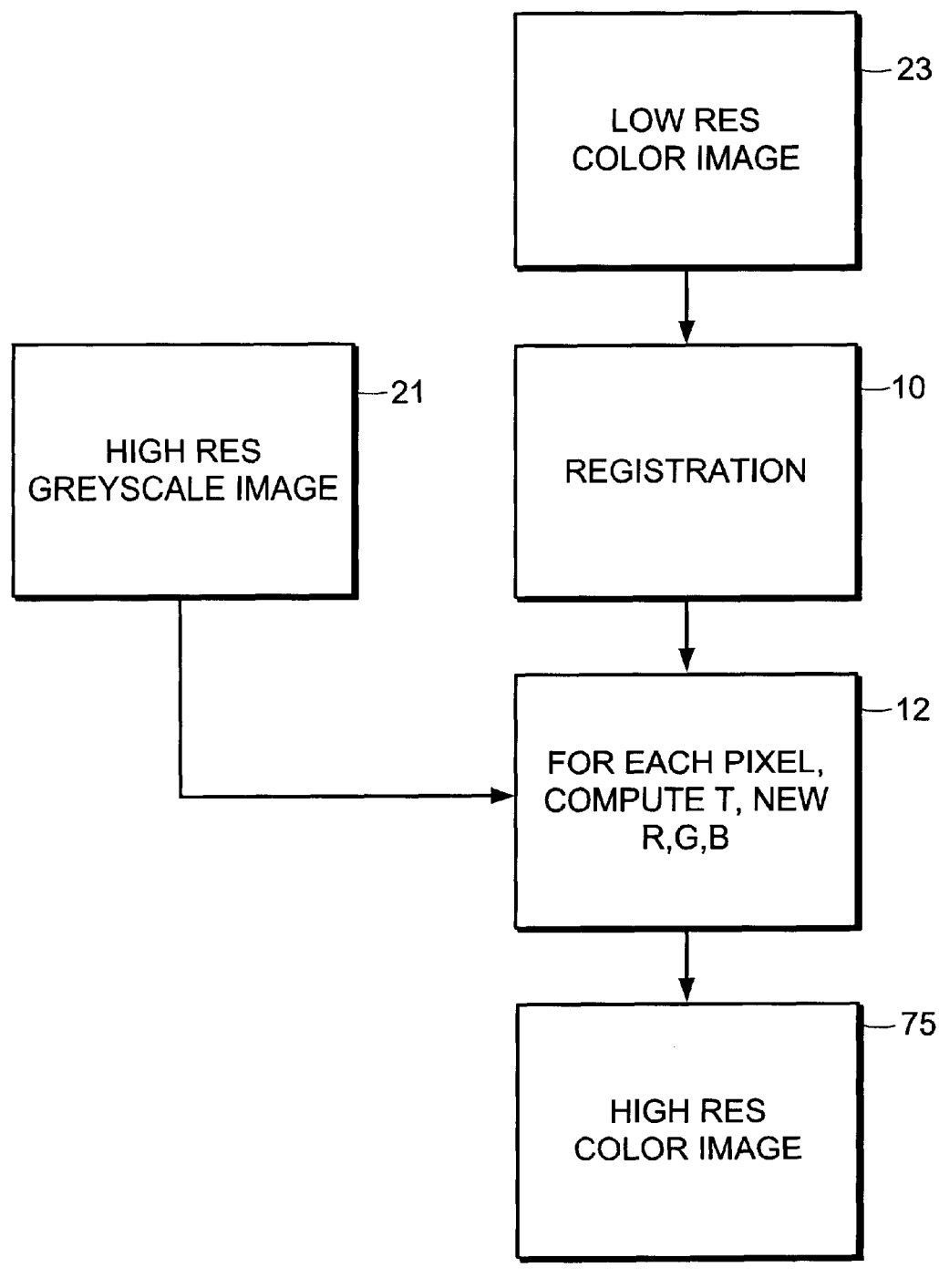
FIG. 1A shows a high level diagram of processing steps to implement the present invention.
Figure 1B:
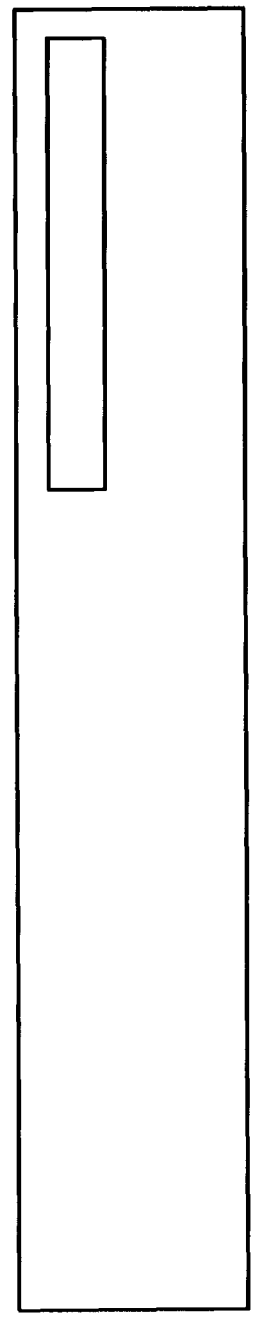
FIG. 1B shows a computer program source code example of implementing the invention to calculate T and new RGB (Red, Green and Blue) values.

For software implementation, a program can be written using a computer programming language, for example, C or FORTRAN, and then compiled into a computer executable program using a compiler. The executable program is started by an operator using a mouse or keyboard. An example of computer system for implementing the present greyscale to color conversion invention is shown in FIG. 1B. FIG. 1B shows a pseudo computer program source code example that implements the calculation of T, New Red, New Green and New Blue values.

A high level overview of the present invention will now be discussed with reference to FIG. 1A. FIG. 1A shows a high level diagram of processing steps that implements the present invention, including image registration 10, calculation 12 of T and RGB values for each pixel.

Figure 2:
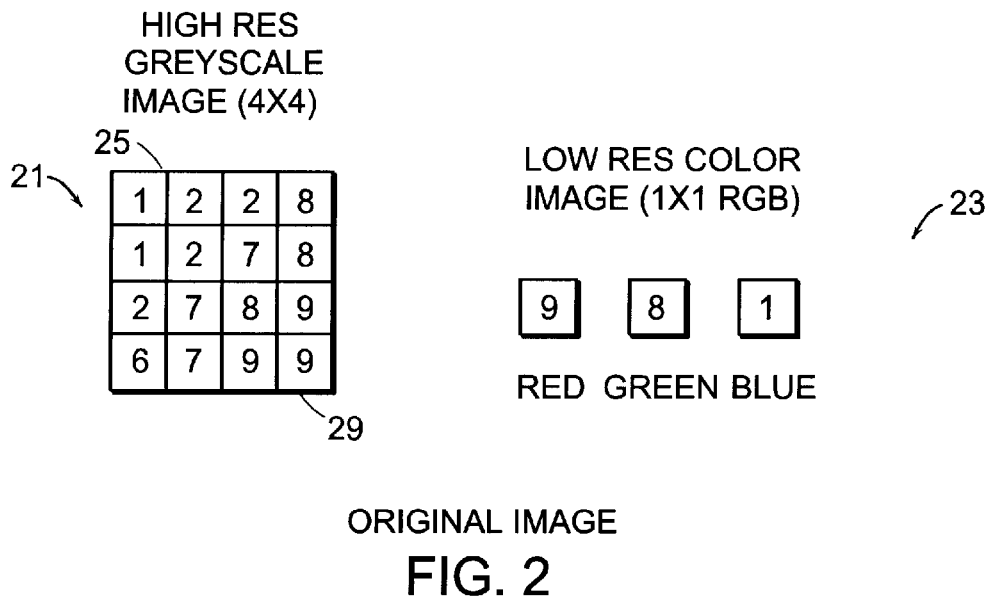
FIG. 2 shows the pixel arrays of both high resolution greyscale image (4×4 =16 pixels) and low resolution color image (1×1=1 pixel of RGB).

FIG. 2 shows an example (on the left) of an 8-bit high resolution greyscale image 21 with sixteen pixels (4×4) and an example (on the right) of a low resolution 24-bit color image 23 with only one pixel. Each pixel in the greyscale image 21 has a single value, for example, one for the first pixel (upper left corner)25 and nine for the last pixel 29 (lower right corner). Each pixel in the color image 23 has three color elements (RGB), in the example which has only one pixel, nine for red, eight for green and one for blue, respectively.

Figure 3:
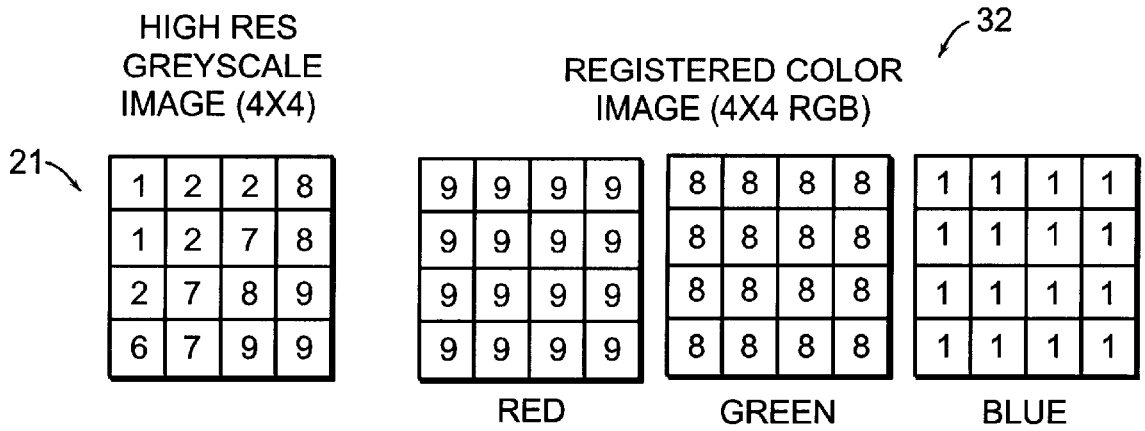
FIG. 3 shows the color image is registered to have the same number of pixels as the greyscale image; each pixel in the registered color image has red, green and blue (RGB) values.

Next the color image 23 is registered using image registration 10 to match the high resolution greyscale image. FIG. 3 shows the registered color image 32 (on the right) which now has same number of pixels as the high resolution greyscale image 21. The RGB values in the registered color image 32 are interpolated from neighbor pixels. Because there is only one pixel in our example, all sixteen pixels (4×4) are simply replicated with same color (9, 8, 1). The greyscale image 21 is not changed at this registration step 10 and is shown on the left in FIG. 3.

Optionally, the RGB values in the low resolution color image 23 may be scaled or stretched to full pixel value dynamic range (for example, 0–255) for better contrast or richer color display. This step is not shown in the example because it is considered an optional preprocessing step to registration 10.

The scalar T is then calculated for each pixel as: T=V/(A*Red+B*Green+C*Blue), where V is the value of the pixel in the greyscale image 21; Red, Green and Blue are the three color elements of the corresponding pixel from the registered color image 32; A, B and C are coefficients that correspond to the "NTSC" red, green and blue CRT phosphors of 1953 and are standardized in ITU-R Recommendation BT. 601-2 (formerly CCIR Rec. 601-2), incorporated herein by reference. Their values are preferably 0.299, 0.587 and 0.114 respectively and may be adjusted according to the spectral or color characteristics of the color elements. FIG. 4 shows the T values calculated for all sixteen pixels of the example of FIGS. 2 and 3. For example, the T value for the first pixel 25 (upper left corner) is calculated as T=1/(0.299*9+0.587*8+0.114*1)=0.133.

Once T is available for all pixel locations, a new color is calculated for each pixel as:

New Red=T*Red value of color image 32 corresponding pixel,

New Green=T*Green value of color image 32 corresponding pixel, and

New Blue=T*Blue value of color image 32 corresponding pixel.

For the sample image as shown in FIG. 5, the new color elements (red, green, blue) are calculated for each pixel using the foregoing formulae. For example, the first pixel position 25 (upper left corner) is calculated as:

New Red=0.133*9=1;

New Green=0.133*8=1;

New Blue=0.133*1=0.

Optionally, the calculation of T and the new color (RGB) value (New Red, New Green, and New Blue) may be combined into a single step, for example:

New Red=Red*V/(A*Red+B*Green+C*Blue);

New Green=Green*V/(A*Red+B*Green+C*Blue);

New Blue=Blue*V/(A*Red+B*Green+C*Blue).

For efficiency consideration, the calculation of T and new color (RGB) values in the present invention may be implemented through the use of look-up-tables. The look-up-table is constructed using the formulae described above. The T or color values (RGB) for a pixel may then be obtained by searching the corresponding look-up-table using V, Red, Green, and Blue values as indices for the tables.

Finally, each pixel in the new image 75 has 3 color elements (RGB) and a high resolution color image (24-bit RGB) is created on a computer system or saved to a computer file for uses such as display, analysis, hardcopy output and so on.

While various embodiments of the present invention have been described above, it should be understood that they have been presented by way of example, and not limitation. Thus the breadth and scope of the present invention should not be limited by any of the above described exemplary embodiments, but should be defined only in accordance with the following claims and their equivalents.

It is understood that a digital processor and corresponding working memory are employed in the computer system embodiment of the present invention.

What is claimed is:

1. In a computer system, a method for converting high resolution greyscale digital image to color using low resolution color or multi-spectral image of the same object or area, said low resolution color or multi-spectral image formed of pixels each pixel having a red, a green, a blue value, comprising the steps of:

(a) registering a low resolution color image to a high resolution greyscale image such that each pixel in the greyscale image corresponds to a pixel at the same location in the high resolution color image;

(b) for each pixel in the high resolution greyscale image, generating three color components (red, green, blue) from the greyscale value of the pixel in the high resolution image and the red, green and blue values of the corresponding pixel in the low resolution image using a factor T calculated as a function of a ratio of total pixel value in the color image to pixel value in the greyscale image.

(c) forming a high resolution color image from the generated three color components for each pixel in the greyscale image.

2. A method as claimed in claim 1 wherein factor T is a scalar calculated for each pixel as:T=V/(A*Red+B*Green+

C*Blue), where Red, Green and Blue are the three color components from the low resolution color image; V is the value of the subject pixel in the greyscale image; A, B, and C are coefficients defined from the "NTSC" red, green and blue standard.

3. A method as claimed in claim 2 wherein raw pixel values are used directly.

4. A method as claimed in claim 2 wherein for contrast enhancement pixel values are scaled to full pixel value range of 0 to 255.

5. A method as claimed in claim 2 wherein the three generated color components (red, green, blue) for the pixel are calculated as:

generated new red=T*Red;

generated new green=T*Green;

generated new blue=T*Blue.

6. A method as claimed in claim 1 wherein at least one of steps (a) through (c) are performed with a computer program.

7. A method as claimed in claim 1 wherein the step of registering physically creates a new image that matches the greyscale image on a pixel by pixel basis.

8. A method as claimed in claim 1 wherein the step of registering establishes a geometric transformation between the two images to calculate corresponding pixel locations.

* * * * *